United States Patent
Bornemann et al.

(10) Patent No.: US 11,289,955 B2
(45) Date of Patent: Mar. 29, 2022

(54) CLAW POLE STATOR FOR A TRANSVERSAL FLUX MOTOR AND A SEGMENT FOR THE CLAW POLE STATOR

(71) Applicant: GKN SINTER METALS ENGINEERING GMBH, Radevormwald (DE)

(72) Inventors: Nils Bornemann, Bonn (DE); Stefan Tiller, Sankt Augustin (DE); Rainer Schmitt, Wachtberg (DE); Hong Giang To, Duesseldorf (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 92 days.

(21) Appl. No.: 16/494,538

(22) PCT Filed: Mar. 7, 2018

(86) PCT No.: PCT/EP2018/055561
§ 371 (c)(1),
(2) Date: Sep. 16, 2019

(87) PCT Pub. No.: WO2018/166858
PCT Pub. Date: Sep. 20, 2018

(65) Prior Publication Data
US 2020/0014255 A1    Jan. 9, 2020

(30) Foreign Application Priority Data
Mar. 14, 2017 (DE) .................... 10 2017 105 361.1

(51) Int. Cl.
H02K 1/14 (2006.01)
(52) U.S. Cl.
CPC ......... *H02K 1/145* (2013.01); *H02K 2201/03* (2013.01); *H02K 2201/12* (2013.01)

(58) Field of Classification Search
CPC ... H02K 1/14; H02K 2201/12; H02K 2201/03
(Continued)

(56) References Cited

U.S. PATENT DOCUMENTS

2002/0025396 A1   2/2002 Hjertman et al.
2006/0208601 A1   9/2006 Enomoto et al.
(Continued)

FOREIGN PATENT DOCUMENTS

CN    1249804 A    4/2000
CN    1835339 A    9/2006
(Continued)

OTHER PUBLICATIONS

Japan Patent Office, Notice of Reasons for Rejection, Application No. 2019-572284, dated Dec. 14, 2021, 5 pages [English Language Translation Only].

*Primary Examiner* — Naishadh N Desai
(74) *Attorney, Agent, or Firm* — Quarles & Brady LLP

(57) ABSTRACT

A claw pole stator for a transversal flux motor includes a multiplicity of segments positioned next to one another along a circumferential direction for the annular claw pole stator. Each segment extends from an inner circumferential surface along a radial direction to an outer circumferential surface and is delimited in the circumferential direction by a first side surface and a second side surface and in an axial direction by a first end surface and a second end surface. Each segment is connected by the side surfaces to at least one other segment to form the annular claw pole stator. Segments positioned adjacent each other contact each other by a first contact surface on the first side surface or by a second contact surface on the second side surface and due to the contact surfaces form a form-locking connection in the circumferential direction.

14 Claims, 3 Drawing Sheets

(58) Field of Classification Search
USPC .... 310/156.66, 156.69, 156.71, 156.73, 257, 310/263
See application file for complete search history.

(56) References Cited

U.S. PATENT DOCUMENTS

| | | |
|---|---|---|
| 2006/0208602 A1 | 9/2006 | Enomoto et al. |
| 2008/0069686 A1* | 3/2008 | Masaki ............... F04D 25/0646 415/121.2 |
| 2008/0093950 A1 | 4/2008 | Cros et al. |
| 2010/0289348 A1* | 11/2010 | Gruendl .................. H02K 9/22 310/54 |
| 2012/0119599 A1 | 5/2012 | Calley et al. |
| 2012/0235519 A1 | 9/2012 | Dyer et al. |
| 2013/0154397 A1* | 6/2013 | Sullivan ................ H02K 1/141 310/12.18 |
| 2014/0139065 A1 | 5/2014 | Yamada et al. |
| 2015/0048708 A1 | 2/2015 | Nord et al. |
| 2018/0262142 A1* | 9/2018 | Kato ................... H02K 1/2766 |

FOREIGN PATENT DOCUMENTS

| | | |
|---|---|---|
| CN | 101741200 A | 6/2010 |
| DE | 102009021703 A1 | 11/2010 |
| DE | 102010018145 B4 | 7/2012 |
| JP | 2006296188 A | 10/2006 |
| WO | 9839572 A1 | 9/1998 |
| WO | 0060720 A1 | 10/2000 |
| WO | 2005057755 A1 | 6/2005 |

\* cited by examiner

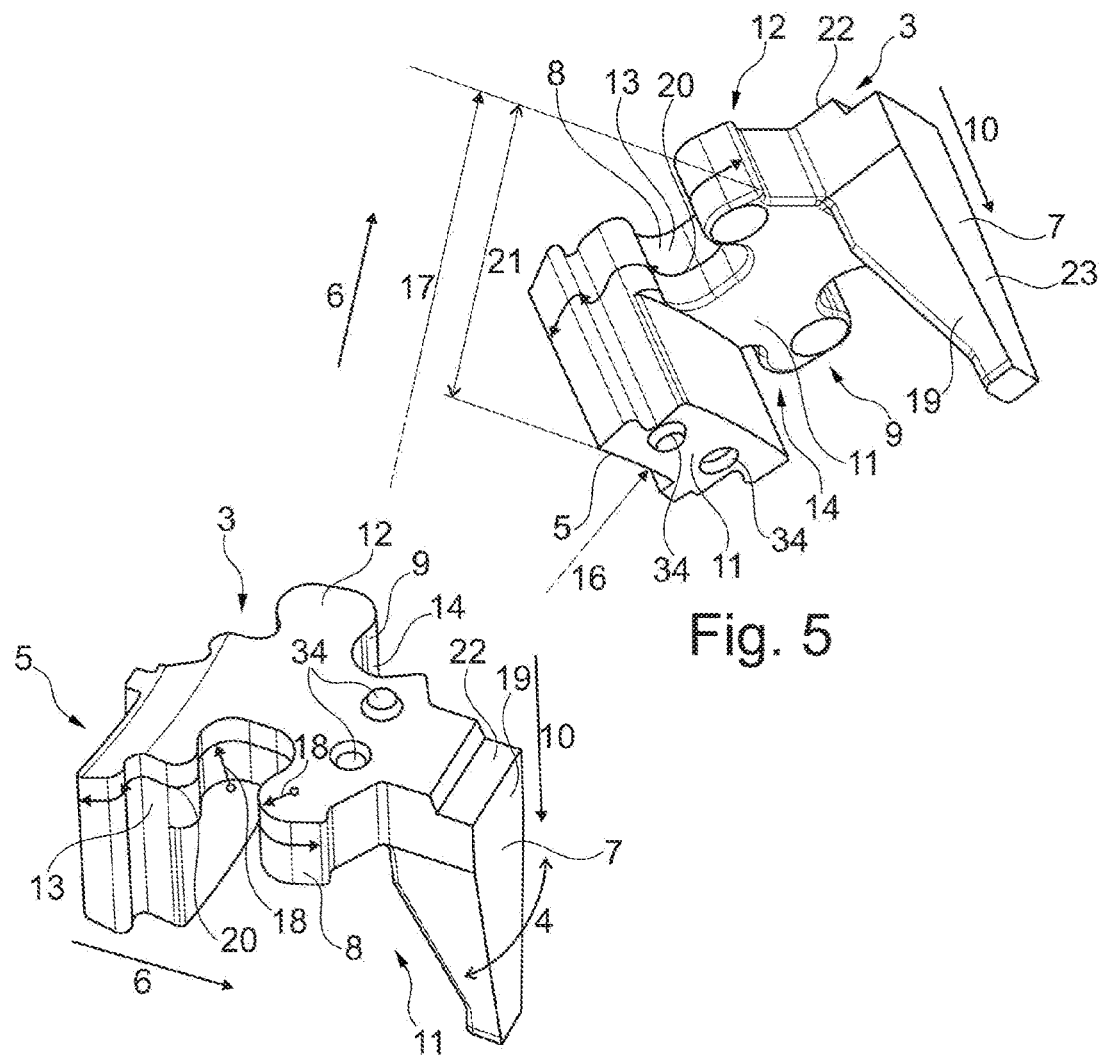
Fig. 5
Fig. 6
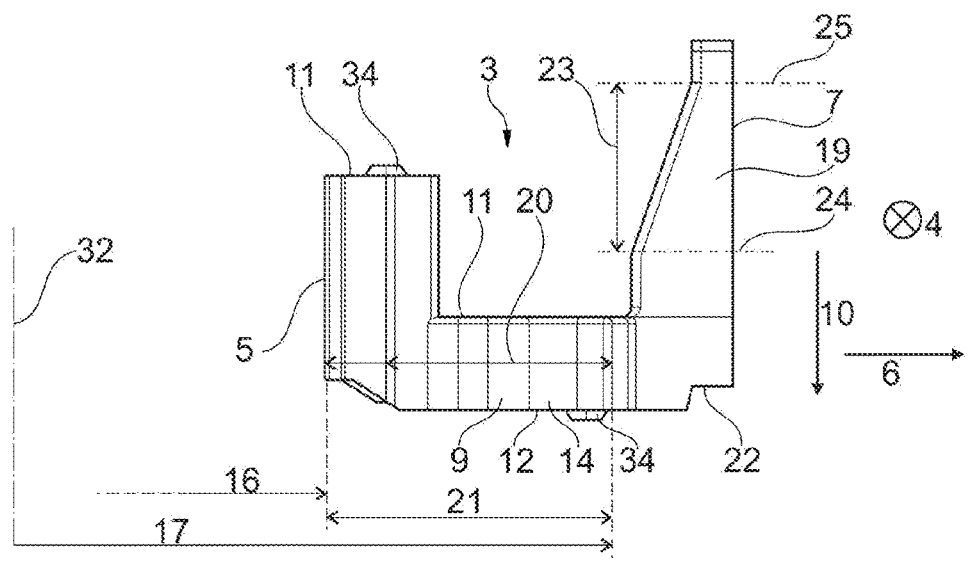
Fig. 7

CLAW POLE STATOR FOR A TRANSVERSAL FLUX MOTOR AND A SEGMENT FOR THE CLAW POLE STATOR

BACKGROUND OF THE INVENTION

Field of the Invention

The invention relates to a claw pole stator for a transversal flux motor and a segment for the claw pole stator. Transversal flux motors are electric drives that can be used as generators and as electric machines. Transversal flux motors regularly comprise a stator and a rotor. The rotor in this case is referred to as the support for permanent magnets, whereas the stator has a coil device. The rotor or the stator can be connected to a shaft, which is driven by the transversal flux motor (operation as electric machine) or transmits a rotary motion to the transversal flux motor (generator mode).

An electric axial flux machine is known, for example, from DE 10 2009 021 703 B4. Among other things, it proposes forming the magnetic flux yoke out of a plurality of annular cylinder segments. The annular cylinder segments contact one another by means of side faces oriented in the circumferential direction.

It is particularly advantageous to manufacture claw pole stators powder metallurgically. To accomplish this, a powder with a predetermined composition is supplied to a press and pressed. A subsequent heat treatment serves to remove organic components. In particular, the powder particles have electrically insulating coatings. Powder metallurgical manufacturing can produce high-precision components.

It has now turned out that the particular geometry of a claw pole stator cannot be manufactured powder metallurgically without problems. In particular, tapering poles of the claw pole stator cannot be easily manufactured with a very homogeneous, high density.

SUMMARY OF THE INVENTION

Based on this, the object of the present invention is to at least partially solve the problems explained above with reference to the prior art. In particular, a claw pole stator should be proposed, which is embodied to be particularly suitable for powder metallurgical manufacturing.

In order to attain this object, a claw pole stator and a segment for the claw pole stator 1 as described below are proposed. Advantageous modifications are the subject of the dependent claims. The features cited individually in the claims can be combined with one another in a technologically meaningful way and can be enhanced by means of explanatory circumstances taken from the description and details from the figures, which depict additional embodiment variants of the invention.

A contribution to this is made by a claw pole stator for a transversal flux motor, wherein the claw pole stator is formed of a plurality of segments, which are positioned next to one another along a circumferential direction and form the annular claw pole stator. Each segment extends starting from an inner circumferential surface along a radial direction to an outer circumferential surface and is delimited in the circumferential direction by a first side surface and a second side surface and delimited in an axial direction by a first end surface and a second end surface. Each segment is connected by means of the side surfaces to at least one other segment to form the annular claw pole stator, wherein segments that are positioned adjacent to each other contact each other by means of a first contact surface of the first side surface or by means of a second contact surface of the second side surface of the respective segment and by means of the contact surfaces, form a form-locking connection in the circumferential direction.

In particular, a first segment contacts an adjacently positioned second segment by means of its first contact surface or its second contact surface. If the two segments are identical to each other, then the first segment, by means of its first contact surface, can (directly or indirectly) contact the second segment by means of its second contact surface. The same can be correspondingly true for the other second side surface of the first segment and the second contact surface that is positioned there.

A segmentation of the claw pole stator is proposed here. The individual segments can thus be manufactured with a compactly embodied matrix of a press tool. In particular, special measures can be implemented in order to more easily manufacture the most homogeneous and high density in the segment.

A segmentation of the claw pole stator, however, results in the problem of the assembly of the segments into the annular claw pole stator. In this case, on the one hand, a good handling of the segments should be enabled and on the other hand, the most precise possible positioning of the segments relative to one another can be achieved. In the present case, this can be achieved and ensured through the embodiment of form-locking connections in the circumferential direction between adjacently positioned segments. Form-locking connections are produced by the mutual engagement of at least two connecting partners (the segments here). As a result, the connecting partners do not come apart even without a transmission of force or with an interrupted transmission of force. In other words, with a form-locking connection, the one connecting partner is in the way of the other (in this case preventing a movement relative to each other in the circumferential direction).

With the form-locking connections, the individual segments can be assembled to form the annular claw pole stator. In particular, the segments can be positioned on a support body, which aligns the segments to one another—at least by means of their inner circumferential surface or their outer circumferential surface—and keeps them aligned. Preferably, the segments are then connected to one another, e.g. by means of a plastic, which is supplied to the claw pole stator for example in a liquid state and then solidifies.

The design of a claw pole stator will be explained below. Two claw pole stators are positioned next to each other along the axial direction and they contact each other by means of the end surfaces. Each claw pole stator has a plurality of poles, which extend starting from a base surface along the axial direction. First poles of the first claw pole stator and second poles of the second claw pole stator are positioned in alternating fashion along the circumferential direction, respectively adjacent to one another and overlapping one another in the axial direction, but spaced apart from one another. The poles can be positioned against the inner circumferential surface or against the outer circumferential surface. The claw pole stators then contact each other by means of the end surfaces at the outer circumferential surface or at the inner circumferential surface. In the intermediate space of the claw pole stators, in the axial direction between the end surfaces and in the radial direction between the mutually contacting end surfaces and the poles, a coil extending around in the circumferential direction can be positioned between the claw pole stators. It is likewise possible to position other pairs of claw pole stators with coils against the first pair. For example, multi-phase transversal flux motors can be produced in this way. In particular, a transversal flux motor can have produce electrical power outputs from 0.01 kW [kilowatt] over 5,000 kW.

On the end surfaces of the claw pole stators, positioning aids can be provided, which cooperate with corresponding positioning aids on the opposing end surfaces (e.g. raised areas and recesses).

In particular at least one of the contact surfaces between a first radius and a second radius extends along the radial direction in meandering fashion. In particular, "in meandering fashion" means with a curvature, particularly relative to the curvature radii that are oriented in alternating fashion in the radial direction. "In meandering fashion" can be the shape when the contact surface extends on both sides of an imaginary line that is in the middle of or central to the shape of the contact surface and parallel to the radial direction.

In particular, the poles are positioned outside or inside the contact surface in the radial direction.

On each side surface of the segment, a contact surface is provided. The contact surface comprises a partial area of the side surface. In particular, the contact surface extends across the entire respective span of the side surface along the axial direction. Preferably, the contact surface extends over only a part of the span of the side surface along the radial direction.

The contact surface extends in meandering fashion along the radial direction, wherein the form-locking connection to an adjacently positioned segment is formed by means of the meandering shape of the contact surface.

Such a meandering (but simultaneously sharp-edged) shape of the contact surface is produced, for example, by a dovetail embodiment of the contact surfaces.

Preferably, at least one of the contact surfaces has a minimum curvature radius of at least 1.0 mm [millimeter], preferably at least 2.0 mm, along the meandering shape. Such a minimum radius reduces the risk of cracks forming in the segment that can occur especially in sharp-edged embodiments of a form-locking connection (e.g. a dovetail).

In particular, the at least one contact surface along the meandering shape has an exclusively curved shape. In particular, there is no rectilinear region of the contact surface in the radial direction. In other words, every point on the contact surface along the radial direction is formed by a curvature radius (which changes along the radial direction).

Preferably, the at least one contact surface extends along the meandering shape over a length, which is greater by a factor of at least 1.5, in particular by a factor of at least two (2.0), than a distance between the first radius and the second radius along the radial direction. Because of the meandering shape, therefore, the contact surface is elongated (in comparison to a rectilinear shape between the first radius and the second radius along the radial direction).

An enlargement of the contact surface also increases the strength of the joined claw pole stator. In addition, the meandering shape and the enlargement of the contact surface reduces the play and the relative movement of the segments relative to each other so that the handling of the claw pole stator can be improved, e.g. for positioning it on a support body.

According a first embodiment, each segment comprises a plurality of poles.

According to a second embodiment, each segment has exactly one (single) pole. With segments of this kind, it is possible to use a particularly compact matrix of a press tool, which is used to manufacture the segment. In addition, it is then specifically possible to take additional steps for further homogenization of the density in the press part (green compact) in a simple and inexpensive way.

The segmentation enables an inexpensive and high-precision manufacture of a claw pole stator since on the one hand, the very small segments can be produce in with high precision and on the other hand, the segments can be aligned and positioned precisely relative to one another by means of a centering device (e.g. the support body). This high-precision form of the claw pole stator that is produced in this way can then be fixed in position by means of a fixing measure (e.g. embedding in a plastic).

In particular, it is proposed for each of the segments to be manufactured powder metallurgically by means of pressing and heat treatment.

Preferably, the claw pole stator is formed exclusively of identically embodied segments. Then the segments have first contact surfaces, which form the form-locking connection with the second contact surfaces of an adjacently positioned segment.

In particular, the claw pole stator forms a cylindrical contour with the outer circumferential surface or the inner circumferential surface of the segments; a circumferential surface of the outer circumferential surface and the inner circumferential surface is formed by the poles of the segments; and this circumferential surface has a deviation from the cylindrical contour of at most 50 μm [micrometer], in particular at most 25 μm.

In particular, the segments in this case are already fixed in their position relative to one another, e.g. by being embedded in a plastic.

A segment for a claw pole stator, in particular one that is specifically disclosed herein, is proposed, wherein the segment extends starting from an inner circumferential surface along a radial direction to an outer circumferential surface and is delimited in the circumferential direction by a first side surface and a second side surface and delimited in an axial direction by a first end surface and a second end surface. The segment can be connected by means of the side surfaces to at least one other segment to form the annular claw pole stator, wherein segments that can be positioned adjacent to one another contact one another by means of a first contact surface of the first side surface or by means of a second contact surface of the second side surface. The contact surfaces are shaped so that by means of the contact surfaces, a respective connection that is form-locking in the circumferential direction can be formed with a complementarily shaped contact surface of a segment that can be adjacently positioned.

In particular, at least one (preferably both) of the contact surfaces extends parallel to the axial direction.

In particular, a pole of the segment extends starting from a base surface along the axial direction and simultaneously tapers. In the region of the tapering, the pole has a largest cross-sectional area and a smallest cross-sectional area, each transverse to the axial direction. A ratio of the largest cross-sectional area to the smallest cross-sectional area is at least two (2) and preferably, at least three (3).

In particular, the segment is manufactured powder metallurgically by means of pressing and heat treatment.

According to another aspect, a transversal flux motor is proposed, at least comprising a stator and a rotor, with the stator comprising at least two of the above-described claw pole stators, wherein first poles of the first claw pole stator and second poles of the second claw pole stator are positioned in alternating fashion along the circumferential direction, respectively adjacent to one another and over-lapping one another in the axial direction. In this case, the claw pole stators are positioned relative to each other so that the poles extend starting from the base surface along the axial direction to the other claw pole stator.

The axial direction is oriented parallel to a rotation axis of the transversal flux motor.

In particular, the rotor extends in annular fashion and, along the circumferential direction, has a plurality of permanent magnets; between the rotor and the stator, an air gap is provided extending around in the circumferential direction, which is at most 350 µm [micrometer] in the radial direction, in particular at most 250 µm, especially at most 150 µm, and the air gap and has a deviation of at most 50 µm, in particular at most 25 µm.

The statements with regard to the claw pole stator apply equally to the segment and/or the transversal flux motor and vice versa.

The transversal flux motor can particularly be used for electrically driven bicycle wheels (pedelecs).

As a precaution, it should be noted that the numerical words used here ("first," "second," . . . ) are primarily (only) to differentiate between several similar articles or sizes, i.e. they particularly do not absolutely specify any dependence and/or sequence of these articles or sizes relative to one another. If a dependence and/or sequence is required, then this will be explicitly indicated herein or will become clearly apparent to the person skilled in the art upon study of the specifically described embodiment.

The invention and the technical sphere will be described in detail below based on the figures. It should be noted that the invention should not be limited by the exemplary embodiments shown. In particular, unless otherwise explicitly indicated, it is also possible to extract sub-aspects of the circumstances described in the figures and combine them with other components and knowledge from the present description and/or figures. In particular, it should be noted that the figures and in particular the depicted proportions are only schematic. The same reference numerals are used to identify the same articles so that if need be, explanations from other figures can be consulted additionally.

BRIEF DESCRIPTION OF THE SEVERAL VIEWS OF THE DRAWING

FIG. 5: shows a first perspective view of a segment;
FIG. 6: shows a second perspective view of the segment from FIG. 5;
and
FIG. 7: shows a side view of a segment from FIGS. 5 and 6.

DESCRIPTION OF THE INVENTION

Figure 1:
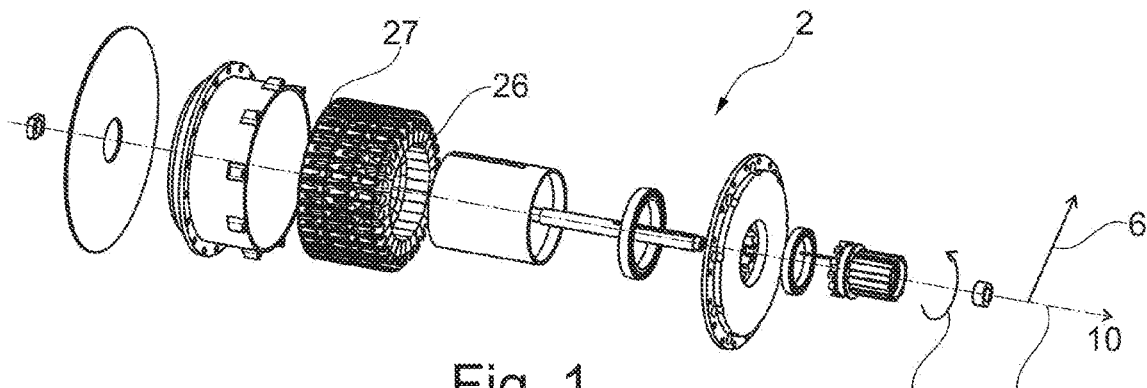
FIG. 1: shows a perspective, exploded view of a transversal flux motor.
Figure 2:
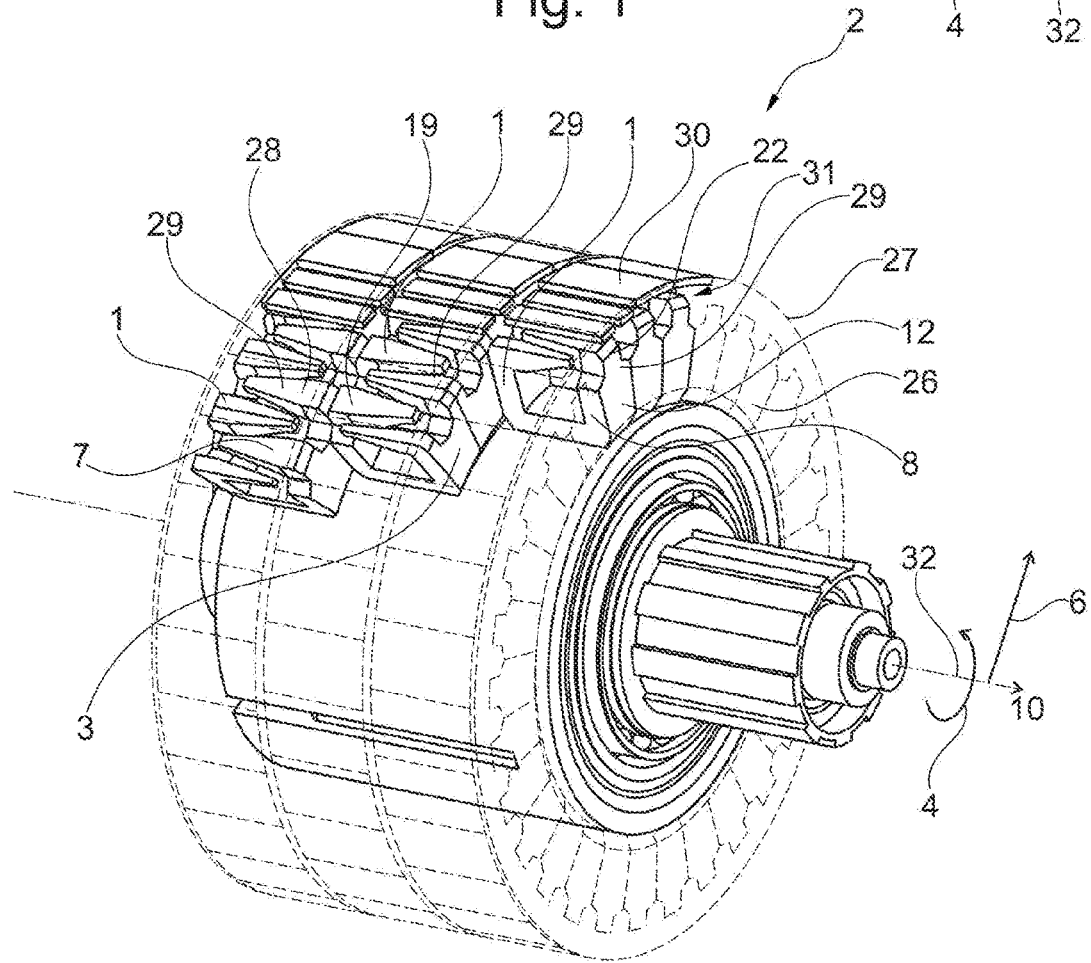
FIG. 2: shows a perspective, partially sectional view of the transversal flux motor from FIG. 1.
Figure 3:
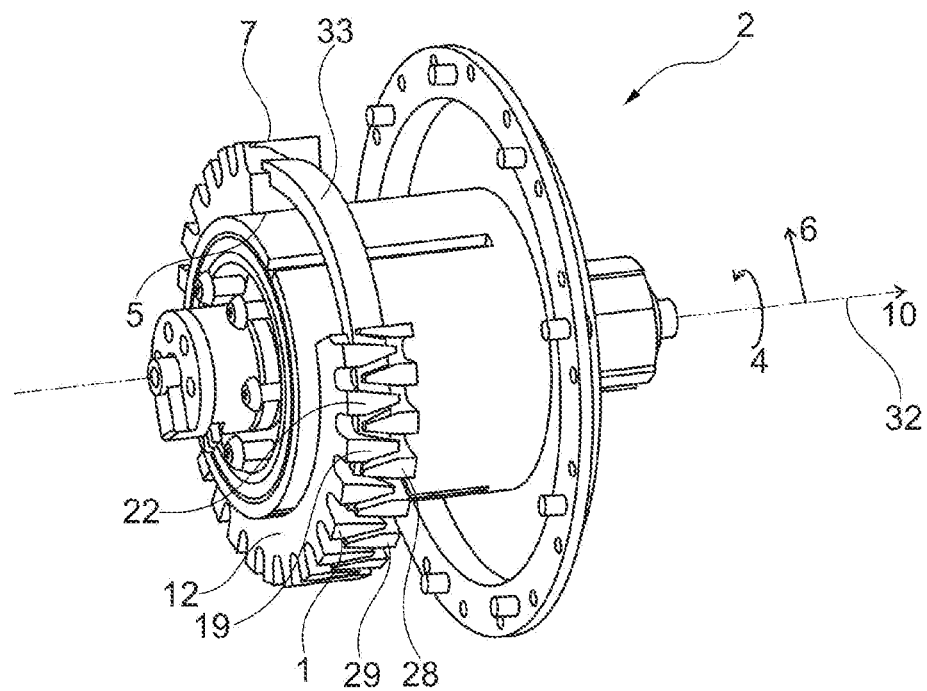
FIG. 3: shows a perspective view of a part of the transversal flux motor from FIGS. 1 and 2.

FIG. 1 shows a perspective, exploded view of a transversal flux motor 2. FIG. 2 shows a perspective, partially sectional view of the transversal flux motor 2 from FIG. 1. FIG. 3 shows a perspective view of a part of the transversal flux motor from FIGS. 1 and 2. FIGS. 1 to 3 will be described jointly below.

Among other things, the transversal flux motor 2 comprises a stator 26 and a rotor 27; the stator 26 here comprises six of the claw pole stators 1; first poles 19 of each first claw pole stator 1 and second poles 28 of each second claw pole stator 29 are positioned in alternating fashion along the circumferential direction 4, respectively adjacent to one another and overlapping one another in the axial direction 10. In this case, the claw pole stators 1, 29 are positioned relative to each other so that the poles 19, 28 extend starting from the base surface 22 along the axial direction 10 to the other claw pole stator 29, 1.

The axial direction 10 is oriented parallel to a rotation axis 32 of the transversal flux motor 2.

The rotor 27 extends in annular fashion and, along the circumferential direction 4, has a plurality of permanent magnets 30; between the rotor 27 and the stator 26, an air gap 31 is provided extending around in the circumferential direction 4.

Each claw pole stator 1, 29 is composed of a plurality of segments 3, which, positioned next to one another along a circumferential direction 4, form the annular claw pole stator 1, 29. Each segment 3 extends starting from an inner circumferential surface 5 along a radial direction 6 to an outer circumferential surface 7 and is delimited in the circumferential direction 4 by a first side surface 8 and a second side surface 9 and delimited in an axial direction 10 by a first end surface 11 and a second end surface 12. Each segment 3 is connected by means of the side surfaces 8, 9 to other segments 3 to form the annular claw pole stator 1. The form-locking connections 15 der segments 3 are not shown in FIGS. 1 to 3.

Two claw pole stators 1, 29 are positioned next to each other along the axial direction 10; they contact each other by means of the first end surfaces 11. Each claw pole stator 1, 29 has a plurality of poles 19, 28, which extend starting from a base surface 22 along the axial direction 10. First poles 19 of the first claw pole stator 1 and second poles 28 of the second claw pole stator 29 are positioned in alternating fashion along the circumferential direction 4, respectively adjacent to one another and overlapping one another in the axial direction 10, but spaced apart from one another. The poles 19, 28 are positioned against the outer circumferential surface 7 of the segments 3. The claw pole stators 1, 29 then contact each other by means of the end surfaces 11 at the inner circumferential surface 5. In the intermediate space of the claw pole stators 1, 29, in the axial direction 10 between the end surfaces 11 and in the radial direction 6 between the mutually contacting end surfaces 11 in the region of the inner circumferential surface 5 and the poles 19, 28 on the outer circumferential surface 7, a coil 33 extending around in the circumferential direction 4 can be positioned between the claw pole stators 1.

Figure 4:
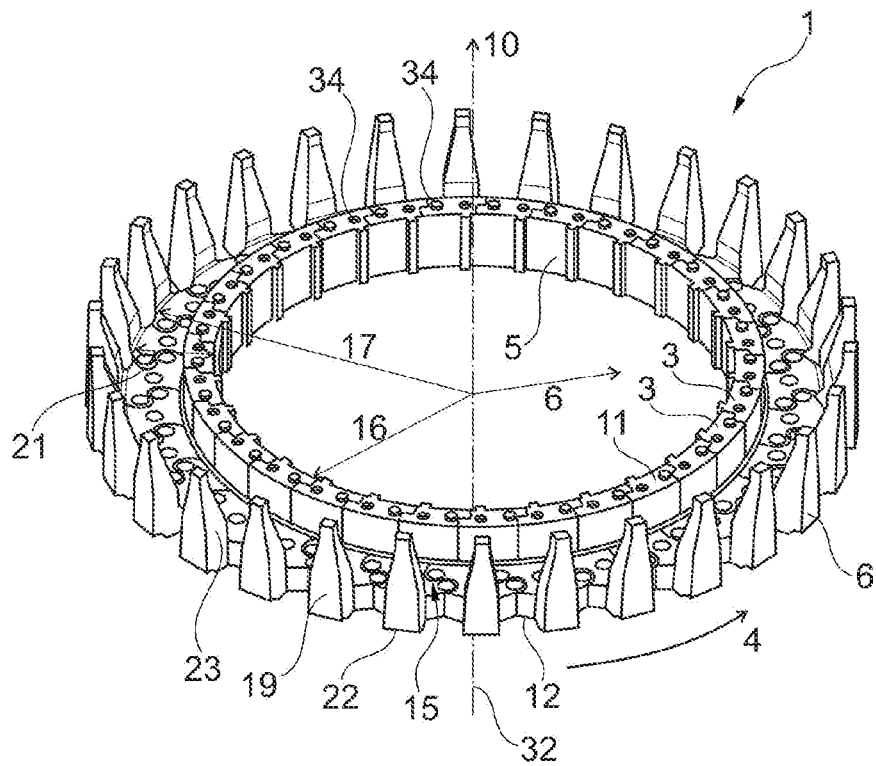
FIG. 4: shows a perspective view of a claw pole stator.

FIG. 4 shows a perspective view of a claw pole stator 1. The claw pole stator 1 is composed of a plurality of segments 3, which, positioned next to one another along a circumferential direction 4, form the annular claw pole stator 1. Each segment 3 extends starting from an inner circumferential surface 5 along a radial direction 6 to an outer circumferential surface 7 and is delimited in the circumferential direction 4 by a first side surface 8 and a second side surface 9 and delimited in an axial direction 10 by a first end surface 11 and a second end surface 12. Each segment 3 is connected by means of the side surfaces 8, 9 to other segments 3 to form the annular claw pole stator 1. Segments 3 positioned adjacent to one another contact one another by means of a first contact surface 13 of the first side surface 8 or by means of a second contact surface 14 of the second side surface 9 of each segment 3 (also see FIGS. 5 to 7) and by means of the contact surfaces 13, 14, form a form-locking connection 15 in the circumferential direction 4.

The form-locking connections 15 are produced by the mutual engagement of at least two connecting partners (the segments 3 here). As a result, the connecting partners cannot come apart even without a transmission of force or with an interrupted transmission of force. In other words, with a form-locking connection 15, the one connecting partner is in the way of the other (in this case preventing a movement relative to each other in the circumferential direction 4). With the form-locking connections 15, the individual segments 3 can be assembled to form the annular claw pole stator 1.

The contact surfaces 13, 14 extend in meandering fashion between a first radius 16 and a second radius 17 along the radial direction 10. The poles 19 are positioned outside the contact surfaces 13, 14 in the radial direction 6. On each side surface 8, 9 of the segment 3, a contact surface 13, 14 is provided. The contact surface 13, 14 comprises a partial area of the side surface 8, 9. The contact surfaces 8, 9 respectively extend across the entire span of the side surface 8, 9 along the axial direction 10. The contact surfaces 13, 14 extend over only a part of the span of the side surface 8, 9 along the radial direction 6.

The contact surfaces 13, 14 extend in meandering fashion along the radial direction 6, wherein the form-locking connection 15 to an adjacently positioned segment 3 is formed by means of the meandering shape of the contact surface 13, 14.

In this case, all of the segments 3 are embodied identically to one another so that the first segment 3, by means of its first contact surface 13, contacts the second segment 3, by means of its second contact surface 14. The same then correspondingly applies to the other, second side surface 9 of the first segment 3 and the second contact surface 14 that is positioned there.

FIG. 5 shows a first perspective view of a segment 3. FIG. 6 shows a second perspective view of the segment 3 from FIG. 5. FIG. 7 shows a side view of a segment 3 from FIGS. 5 and 6. FIGS. 5 to 7 will be described jointly below.

The segment 3 extends starting from an inner circumferential surface 5 along a radial direction 6 to an outer circumferential surface 7 and is delimited in the circumferential direction 4 by a first side surface 8 and a second side surface 9 and delimited in an axial direction 10 by a first end surface 11 and a second end surface 12. The segment 3 can be connected by means of the side surfaces 11 to other segments 3 to form the annular claw pole stator 1; wherein segments 3 that can be positioned adjacent to one another contact one another by means of a first contact surface 13 of the first side surface 8 or by means of a second contact surface 14 of the second side surface 9. The contact surfaces 13, 14 are shaped so that by means of the contact surfaces 13, 14, a respective connection 15 that is form-locking in the circumferential direction 4 can be formed with a complementarily shaped contact surface 14, 13 of a segment 3 that can be adjacently positioned. The two contact surfaces 13, 14 extend parallel to the axial direction 10.

A pole 19 of the segment 3 extends starting from a base surface 22 along the axial direction 10 and simultaneously tapers. In the region of the tapering 23, the pole 19 has a largest cross-sectional area 24 and a smallest cross-sectional area 25, each transverse to the axial direction 10.

On the end surfaces 11, 12 of the segments 3, positioning aids 34 are provided, which cooperate with corresponding positioning aids 34 on the opposing end surfaces 11, 12 of adjacently positioned segments of another claw pole stator 1 (raised areas and recesses here).

The contact surfaces 13, 14 extend in meandering fashion between a first radius 16 and a second radius 17 along the radial direction 10.

The poles 19 are positioned outside the contact surfaces 13, 14 in the radial direction 6.

On each side surface 8, 9 of the segment 3, a contact surface 13, 14 is provided. The contact surface 13, 14 comprises a partial area of the side surface 8, 9. The contact surfaces 8, 9 respectively extend across the entire span of the side surface 8, 9 along the axial direction 10. The contact surfaces 13, 14 extend over only a part of the span of the side surface 8, 9 along the radial direction 6.

The contact surfaces 13, 14 extend in meandering fashion along the radial direction 6, wherein the form-locking connection 15 to an adjacently positioned segment 3 is formed by means of the meandering shape of the contact surface 13, 14. The contact surfaces 13, 14 have a minimum curvature radius 18 along the meandering shape.

Such minimum radius reduces the risk of cracks forming in the segment 3 that can occur especially in sharp-edged embodiments of a form-locking connection 15 (e.g. a dovetail).

Here, the contact surfaces 13, 14 have an exclusively curved shape along the meandering shape. In other words, there are no rectilinear regions of the contact surfaces 13, 14 in the radial direction 6. In other words, every point on the contact surfaces 13, 14 along the radial direction 6 is formed by a curvature radius 18 (which changes along the radial direction 6).

The contact surfaces 13, 14 extend along the meandering shape over a length 20, which is greater by a factor (a multiple) than a distance 21 between the first radius 16 and the second radius 17 along the radial direction 6. Because of the meandering shape, therefore, the contact surfaces 13, 14 are elongated in the radial direction 6 (in comparison to a rectilinear shape between the first radius 16 and the second radius 17 along the radial direction 6) and are thus enlarged.

REFERENCE NUMERAL LIST

1 first claw pole stator
2 transversal flux motor
3 segment
4 circumferential direction
5 inner circumferential surface
6 radial direction
7 outer circumferential surface
8 first side surface
9 second side surface
10 axial direction
11 first end surface
12 second end surface
13 first contact surface
14 second contact surface
15 connection
16 first radius
17 second radius
18 curvature radius
19 pole
20 length
21 distance
22 base surface
23 tapering
24 largest cross-sectional area
25 smallest cross-sectional area
26 stator
27 rotor 28 second pole
29 second claw pole stator
30 permanent magnet
31 air gap
32 rotation axis
33 coil
34 positioning aid

The invention claimed is:

1. A claw pole stator for a transversal flux motor, the claw pole stator comprising:
 a circumferential direction, an axial direction and a radial direction;
 a plurality of powder-metallurgically pressed and heat-treated segments positioned next to one another along said circumferential direction;
 each of said segments extending from an inner circumferential surface along said radial direction to an outer circumferential surface, each of said segments being delimited in said circumferential direction by a first side surface and a second side surface, and each of said segments being delimited in said axial direction by a first end surface and a second end surface;
 each of said segments being connected at said side surfaces to at least one other segment; and
 said segments including mutually adjacent segments contacting each other at a first contact surface on said first side surface or at a second contact surface on said second side surface, forming a form-locking connection at said contact surfaces in said circumferential direction.

2. The claw pole stator according to claim 1, wherein at least one of said contact surfaces between a first radius and a second radius extends along said radial direction with a meandering shape.

3. The claw pole stator according to claim 2, wherein said at least one contact surface has a minimum curvature radius of at least 1 mm [millimeter] along said meandering shape.

4. The claw pole stator according to claim 2, wherein said at least one contact surface has an exclusively curved shape along said meandering shape.

5. The claw pole stator according to claim 2, wherein said at least one contact surface extends along said meandering shape over a length being greater by a factor of at least 1.5 than a distance between said first radius and said second radius along said radial direction.

6. The claw pole stator according to claim 1, wherein each of said segments includes a plurality of poles.

7. The claw pole stator according to claim 1, wherein each of said segments has exactly one pole.

8. The claw pole stator according to claim 1, wherein all of said segments are identically constructed.

9. The claw pole stator according to claim 6, wherein:
 said outer circumferential surface or said inner circumferential surface of said segments form a cylindrical contour;
 said poles of said segments form a circumferential surface of said outer circumferential surface and said inner circumferential surface; and
 said circumferential surface has a deviation from said cylindrical contour of at most 50 μm.

10. A powder-metallurgically pressed and heat-treated segment for a claw pole stator, the segment comprising:
 an inner circumferential surface and an outer circumferential surface defining a radial direction therebetween along which the powder-metallurgically pressed and heat-treated segment extends;
 a first side surface and a second side surface delimiting the segment in a circumferential direction;
 a first end surface and a second end surface delimiting the segment in an axial direction;
 said first side surface and said second side surface configured to connect the segment to at least one other segment;
 said first side surface having a first contact surface and said second side surface having a second contact surface permitting mutually adjacent segments to contact each other at one of said first or second contact surfaces; and
 said contact surfaces of adjacently positioned segments having complementary shapes providing a form-locking connection in said circumferential direction.

11. The segment according to claim 10, wherein at least one of said contact surfaces extends parallel to said axial direction.

12. The segment according to claim 10, which further comprises:
 a base surface;
 a pole extending from said base surface along said axial direction and simultaneously having a taper;
 said pole having a largest cross-sectional area and a smallest cross-sectional area each being transverse to said axial direction in a region of said taper; and
 a ratio of said largest cross-sectional area to said smallest cross-sectional area being at least 2.

13. A transversal flux motor, comprising:
 a rotor;
 a stator including at least first and second claw pole stators according to claim 1;
 said first claw pole stator having first poles and said second claw pole stator having second poles; and
 said first poles and said second poles being alternatingly positioned along said circumferential direction, adjacent one another and overlapping one another in said axial direction.

14. The transversal flux motor according to claim 13, wherein:
 said rotor extends annularly and has a multiplicity of permanent magnets disposed along said circumferential direction;
 said rotor and said stator form an air gap therebetween extending in said circumferential direction; and
 said air gap extends over at most 350 μm [micrometer] in said radial direction and has a deviation of at most 50 μm.

* * * * *